M. J. NEWMAN.
TRAP.
APPLICATION FILED OCT. 17, 1921.
1,425,410.
Patented Aug. 8, 1922.
2 SHEETS—SHEET 1.
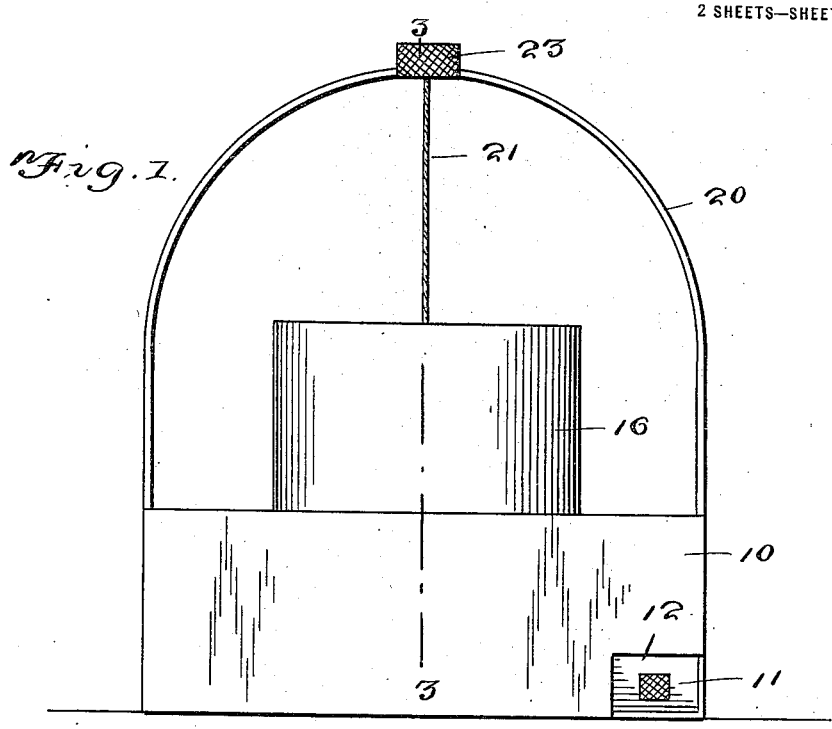
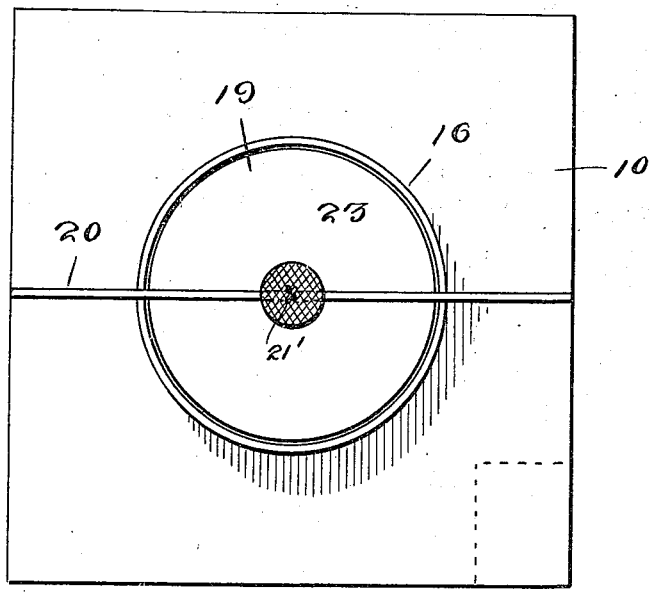
WITNESS:
E. R. Ruppert.
E. Yeager
Mary J. Newman
INVENTOR
BY Victor J. Evans
ATTORNEY

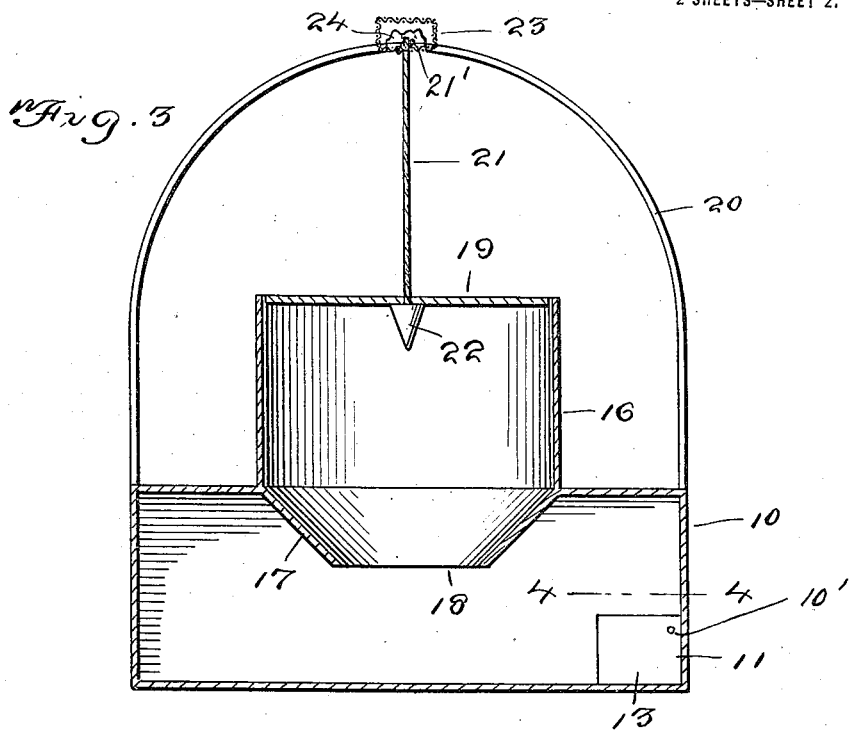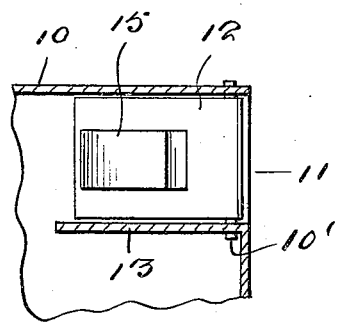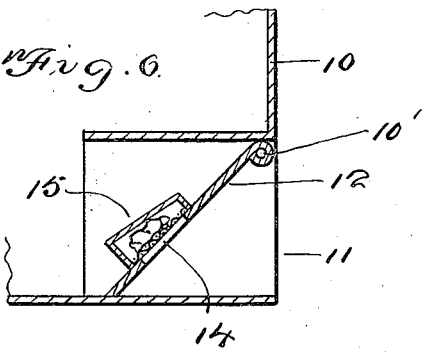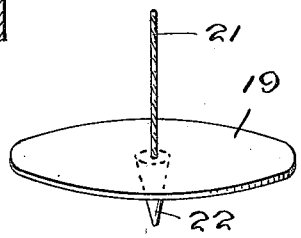

UNITED STATES PATENT OFFICE.

MARY J. NEWMAN, OF FORT SMITH, ARKANSAS.

TRAP.

1,425,410.   Specification of Letters Patent.   Patented Aug. 8, 1922.

Application filed October 17, 1921. Serial No. 508,096.

*To all whom it may concern:*

Be it known that I, MARY J. NEWMAN, a citizen of the United States, residing at Fort Smith, in the county of Sebastian and State of Arkansas, have invented new and useful Improvements in Traps, of which the following is a specification.

This invention relates to traps, and has for its primary object, the provision of a device of this character for trapping large and small animals without killing or otherwise injuring the same.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:

Figure 1 is a side elevation of the trap constructed in accordance with my invention.

Figure 2 is a top plan view.

Figure 3 is a sectional view taken on line 3—3 of Figure 1.

Figure 4 is a sectional view taken on line 4—4 of Figure 3.

Figure 5 is a detail view of the movable cover.

Figure 6 is a sectional view of the trap door.

The trap constructed in accordance with my invention embodies a receptacle 10 which may be constructed from any suitable material, preferably metal and of rectangular configuration. The receptacle may also vary in size without departing from the spirit of the invention. At one corner of the receptacle, I provide an entrance opening 11 which is controlled by a pivoted inwardly opening door 12, this door being mounted between one end wall of the receptacle and a short partition 13. The door is provided with an opening 14 through which the bait may be viewed by the animal, the bait being positioned in a small container 15 secured to the rear side of the door. The construction is such that small animals attracted by the bait, and in an effort to secure the same will enter the opening 11, and pressure against the door 12 causes the latter to move inwardly and upwardly, allowing the animal to enter the receptacle 10, in which it is trapped, due to the fact that the door gravitates to its normally closed position. The door is detachably mounted upon the receptacle and the partition 13, so that it can be removed as the occasion requires to renew the bait. For this purpose, the pivot 10' can be easily removed from the door 12, and the latter subsequently separated from the receptacle.

The receptacle 10 includes a cylindrical portion 16 which is arranged above the receptacle 10 and which includes a flange 17 which converges towards the center of the receptacle to provide a restricted opening 18. The flange 17 projects within the receptacle 10 through a suitable opening in the top thereof, and consequently the cylindrical portion 16 reposes upon the receptacle as illustrated. The cylindrical portion is closed at its upper end by means of a plate 19, which is suspended from an arch-shaped member 20. A flexible element 21 is utilized to suspend the plate 19 in a manner shown, so that the plate is susceptible of being tilted in any direction. Secured to the underside of the plate 10 centrally thereof is a cone-shaped weight 22 which serves to retain the plate in the position shown in Figure 1, and return the plate to this position after being tilted. Mounted upon the top of the member 20 is a container 23 which is also constructed from wire or other suitable foraminated material, and in which container is arranged bait 24. Animals which do not enter the trap through the opening 11, in their effort to secure the bait in the container 23, jump upon the top of the receptacle 10, and then upon the plate 19. By reason of the fact that the plate is susceptible of tilting movement, it is manifest that as soon as the animal lands upon the plate 19, the latter tilts, causing the animal to fall through the cylindrical portion 16 into the trap or receptacle 10. The shape of the flange 17 prevents the animal from escaping from the trap through the cylindrical portion 16 as will be readily understood. The trap is very efficient for the purpose intended, and its simplicity permits of its manufacture and sale at a very nominal cost.

While it is believed from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. A trap of the character described comprising in combination, a receptacle having an opening in the top thereof, a cylindrical portion arranged above the receptacle and received by said opening, said cylindrical portion including a flange arranged within the receptacle and converged toward the center of the receptacle to provide a restricted opening at the lower end of said cylindrical portion for the purpose specified, a plate closing the upper end of the cylindrical portion and susceptible of tilting movement in any direction, and means for normally holding said plate in a horizontal position.

2. A trap of the character described comprising a receptacle having an opening in the top thereof, a cylindrical portion arranged above the receptacle and received by said opening, the lower end of said cylindrical portion being converged to provide a restricted opening in the lower end of said portion, a plate closing the upper end of said cylindrical portion and susceptible of tilting movement in any direction, a bait container arranged above and in spaced relation to said cylindrical portion, and a weight depending from said plate centrally thereof for returning the plate to normal position after being tilted.

3. A trap of the character described comprising a receptacle having an opening, a cylindrical portion arranged above the receptacle and projected through said opening, a plate covering the upper end of said cylindrical portion, an arch-shaped member supported by the receptacle, a flexible element connecting the arch-shaped member and said plate, and suspending the latter for tilting movement in any direction, a weight suspending from said plate for returning the latter to normal position after being tilted, and a bait container supported by the arch-shaped member above the cylindrical portion for the purpose specified.

In testimony whereof I affix my signature.

Mrs. MARY J. NEWMAN.